(12) United States Patent
Greene et al.

(10) Patent No.: US 7,129,310 B2
(45) Date of Patent: Oct. 31, 2006

(54) SOLID SILICONIZED POLYESTER RESINS FOR POWDER COATINGS

(75) Inventors: James A. Greene, Adrian, MI (US); Mohammed Khalid Yousuf, Adrian, MI (US)

(73) Assignee: Wacker Chemical Corporation (DE)

(*) Notice: Subject to any disclaimer, the term of this patent is extended or adjusted under 35 U.S.C. 154(b) by 104 days.

(21) Appl. No.: 10/745,181

(22) Filed: Dec. 23, 2003

(65) Prior Publication Data

US 2005/0136267 A1    Jun. 23, 2005

(51) Int. Cl.
  *C08G 77/14*    (2006.01)
(52) U.S. Cl. .......................... 528/26; 525/446; 525/934
(58) Field of Classification Search .................. 528/26; 525/446, 934
  See application file for complete search history.

(56) References Cited

U.S. PATENT DOCUMENTS

| | | | |
|---|---|---|---|
| 3,701,815 A | 10/1972 | Matzner et al. | |
| 4,113,665 A | 9/1978 | Law et al. | |
| 4,208,503 A | 6/1980 | Martin | |
| 4,250,074 A | 2/1981 | Foscante et al. | |
| 4,385,134 A | 5/1983 | Foscante et al. | |
| 4,532,299 A | 7/1985 | Seneker | |
| 4,608,421 A * | 8/1986 | Lin | 525/403 |
| 4,647,479 A | 3/1987 | Montes | |
| 4,683,271 A * | 7/1987 | Lin et al. | 525/403 |
| 4,783,375 A * | 11/1988 | Hashimoto et al. | 428/32.87 |
| 4,968,751 A * | 11/1990 | Miles et al. | 525/100 |
| 5,097,006 A * | 3/1992 | Kapilow et al. | 528/272 |
| 5,227,435 A | 7/1993 | Kang et al. | |
| 5,266,657 A * | 11/1993 | Hammerton et al. | 525/437 |
| 5,275,645 A | 1/1994 | Ternoir et al. | |
| 5,280,098 A | 1/1994 | Witucki et al. | |
| 5,415,688 A | 5/1995 | Gasmena et al. | |
| 5,417,744 A | 5/1995 | Gasmena | |
| 5,464,909 A * | 11/1995 | Chang et al. | 525/438 |
| 5,508,358 A * | 4/1996 | Ono et al. | 525/446 |
| 5,516,858 A | 5/1996 | Morita et al. | |
| 5,520,952 A | 5/1996 | Tanitsu et al. | |
| 5,618,860 A | 4/1997 | Mowrer et al. | |
| 5,650,474 A | 7/1997 | Yamaya et al. | |
| 5,663,215 A | 9/1997 | Milligan | |
| 5,703,178 A | 12/1997 | Gasmena | |
| 5,736,619 A | 4/1998 | Kane et al. | |
| 5,804,616 A | 9/1998 | Mowrer et al. | |
| 5,952,439 A * | 9/1999 | Morita et al. | 525/476 |
| 6,130,273 A * | 10/2000 | Edwards et al. | 523/351 |
| 6,326,055 B1 * | 12/2001 | Arai et al. | 427/195 |
| 6,344,520 B1 | 2/2002 | Greene | |
| 6,713,586 B1 | 3/2004 | Greene | |
| 6,897,259 B1 * | 5/2005 | Cramer et al. | 525/100 |
| 2002/0028879 A1 * | 3/2002 | Chasser et al. | 525/101 |

FOREIGN PATENT DOCUMENTS

| | | |
|---|---|---|
| EP | 0 581 545 A1 | 7/1993 |
| WO | WO 96/25445 | 8/1996 |
| WO | WO 97/11983 | 4/1997 |

OTHER PUBLICATIONS

Encyclopedia of Science and Technology "Coating Methods, Powder Technology", Chatper 3: Thermosetting Coating Powders, 2002.*
English Derwent Abstract Corresponding to XP-002142930 (AN 1998-191841[17]).

* cited by examiner

*Primary Examiner*—Margaret G. Moore
(74) *Attorney, Agent, or Firm*—Brooks Kushman P.C.

(57) ABSTRACT

The present invention pertains to a siliconized polyester resin that has a sufficiently high Tg that the siliconized polyester is a solid at room temperature. The silicone polyester preferably has a Tg of 30° C. or greater. The silicone polyester can be produced as a particulate and remain stable at room temperature. The particulate silicone polyester is suitable for use in coating compositions, including powder coating compositions. The coating can be clear or pigmented, and thus optionally can include pigment. The coating composition also includes a crosslinker. The coating composition can be ground into a powder. The powder is stable at room temperature. The powder is then capable of being coated on a suitable substrate and then baked to form a coated metal object.

19 Claims, No Drawings

SOLID SILICONIZED POLYESTER RESINS FOR POWDER COATINGS

BACKGROUND OF THE INVENTION

1. Field of the Invention

The present invention relates to solid siliconized polyester resins, coating compositions containing the resin, coatings made from the coating composition, products coated by the coatings, and methods for making the same.

2. Background Art

Polyester resins have been used in industry for years as a binder for making conventional baking enamels and thermoset powder coatings for industrial, architectural, and maintenance coatings. Polyester resins with hydroxy functional groups lend themselves to being used in combination with crosslinkers such as melamine or isocyanates.

The incorporation of silicone into the backbone of the polyester polymer increases the heat resistance and UV resistance of the polymer, which moves the conventional polyester from low durability to high durability. Incorporating silicone into the backbone of the polyester increases the heat resistance of the resulting polymer makes it more suitable for use in coatings for mufflers, cookware and bakeware products, automotive products, architectural products. Coatings currently utilizing this approach are liquid silicone modified polyester and are generally in solution containing between 50–70% solids.

The current trend is to move to low VOC coatings, and therefore a solid version of silicone modified polyester (SMP) would be ideal for powder coatings applications. The conventional technology utilizes liquid or flake silicone intermediates, which have low glass transition temperatures (Tg) and will not form stable SMP flakes. The use of the low Tg intermediate forms a SMP, which will re-agglomerate over time forming large lumps, which renders the resulting SMP unsuitable for use in power coatings.

Accordingly, it will be desirable to provide a suitable solid silicone modified polyester and coating that overcomes at least one problem in the prior art.

SUMMARY OF THE INVENTION

The present invention pertains to a siliconized polyester resin that has a sufficiently high Tg that enables the siliconized polyester to remain a stable solid at room temperature. The silicone polyester preferably has a Tg of 30° C. or greater. The silicone polyester can be produced as a particulate, such as flake or powder, and remain stable at room temperature. The solid particulate silicone polyester is suitable for use in coating compositions, including powder coating compositions. The coating can be clear or pigmented, and thus can optionally include different types of pigment and filler. The coating composition also includes a crosslinker. Any suitable crosslinker can be used, however, the crosslinker is preferably an isocyanate.

The coating composition is preferably prepared by blending the coating composition components, i.e. the particulate silicone polyester, the crosslinker, and the optional pigment or other optional component(s), and heating, preferably by melt extrusion, the solid components to form a flowable, relatively viscous mixture. The hot molten viscous mixture is allowed to cool (in some embodiments by passing through cooling rolls) and is chopped and ground into a powder. The powder is stable at room temperature. The powder is then capable of being coated on a suitable substrate and then baked to form a coated object. Applications for the coating include cookware, such as cookie sheets, pots and pans, automotive parts such as mufflers, engine components and engines, lawn fixtures, architectural parts, i.e. building parts, outdoor signs, metal coils and other metal substrates.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

The present invention relates to a solid silicone polyester having a glass transition temperature (Tg) greater than 30° C. as measured by DSC. The following suitable DSC method was employed on a Perkin Elmer DSC-7 unit: SMP Sample Size=8.0–12.0 mg. 1.) Hold for 0.1 minute at 15° C. 2.) Heat from 15° C. to 120° C. at a heating rate of 10.0° C. per minute. 3.) Chill from 120° to −20° C. at a cooling rate of 200° C. per minute. 4.) Hold for 3 minutes at −20° C. 5.) Heat from −20° C. to 120° C. at a heating rate of 10° C. per minute. In other embodiments, the silicone polyester has a Tg between 30° C. and 175° C., even more preferably between 35° C. and 130° C., even more preferably between 35° C. and 100° C., even more preferably between 35° C. and 75° C., and even more preferably between 35° C. and 50° C.

The silicone polyester is preferably aliphatic with hydroxyl functionality. The silicone polyester has a number average molecular weight of between 500–500,000, more preferably between 10,000–200,000, and most preferably between 5,000–80,000. The silicone polyester has an acid number of between 0 and 1000 mg KOH/g of silicone polyester, more preferably less than 20, even more preferably between 0.1–15, and most preferably 0.2–10. The silicone polyester has a hydroxyl number of between 1–1000, more preferably 10–800, and even more preferably 25–400, and most preferably 200–300.

The silicone polyester preferably has a weight percent silicone of 1% to 80%, more preferably of 20% to 50%, and most preferably of 28% to 33%.

The remainder of the silicone polyester is polyester. Accordingly, the silicone polyester has a weight % polyester of 20% to 99%, more preferably of 50% to 80%, and most preferably of 67% to 72%.

The silicone polyester has a hydroxy equivalent weight of between 56–5610 g/mole OH, more preferably 70–5610 g/mole OH, even more preferably 140–2244 g/mole OH, and most preferably 187–280 g/mole OH.

The silicone polyester has a melt viscosity, as measured by a CAP 2000H Brookfield Viscometer, of between 1–150 poises, more preferably 2–125 poises, even more preferably 3–100 poises, and most preferably 4–60 poises. Suitable measurements can be made using Brookfield Engineering Laboratories' Viscometer Model CAP 2000 H. Spindle # 6 with operating temperature of 150° C. to 200° C. Reference may be made to ASTM D 4287; ISO 2884; BS 3900.

The silicone polyester is a stable solid at room temperature and can be formed into a particulate, such as flake or powder, which is stable at room temperature. The silicone polyester is suitable for use as a component of a coating composition also containing at least a crosslinker.

The silicone polyester is prepared by reacting a polyester or polyester intermediate having a Tg greater than 30° C. with a silicone having a Tg greater than 30° C. Any suitable silicone having a Tg greater than 30° C. may be used. In other embodiments, the silicone and polyester can each independently have a Tg of between 30–175° C., more preferably 30–150° C., even more preferably 35–125° C., even more preferably 35–100° C., even more preferably 35–75° C., even more preferably 35–50° C., and even more preferably between 35–45° C. Any suitable polyester having a Tg greater than 30° C. may be used. The silicone polyester reaction is a condensation reaction. Such reactions are well known by those well skilled in the art and will not be discussed in too much greater detail further herein. Furthermore, the preparation of suitable polyesters having a Tg greater than 30° C. and suitable silicones having a Tg greater than 30° C. are well known and will not be discussed in great detail further herein.

As discussed above, suitable silicones will have a Tg greater than 30° C. Such silicones and their manufacture are well known to those of ordinary skill in the art. One preferred silicone resin comprises a silanol-functional organopolysiloxane resin which contains at least one or more of the repeating units having the formulae:

$$R^1_a R^2_b SiO_{\frac{1}{2}} \quad \text{(M units)}$$
$$R^1_a R^2_b SiO_{\frac{2}{2}} \quad \text{(D units)}$$
$$R^1_a R^2_b SiO_{\frac{3}{2}} \quad \text{(T units)}$$
$$SiO_{\frac{4}{2}} \quad \text{(Q units)}$$

wherein $R^1$ and $R^2$ are independently a $C_{1-20}$ hydrocarbon, optionally interspersed with a heteroatom linking group such as, but not limited to,

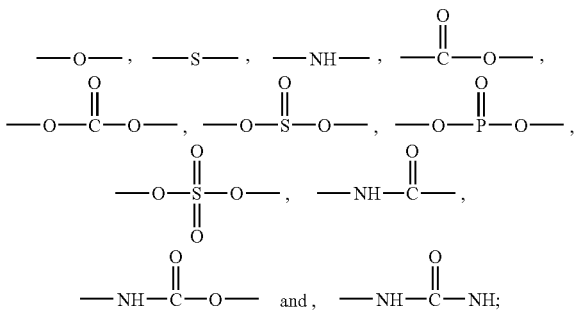

a is an integer of 0, 1, 2 or 3, preferably 0, 1, or 2;
b is an integer of 0, 1, 2 or 3, preferably 0, 1, or 2; and
in M units, a+b+c=3,
in D units, a+b+c=2, and
in T units, a+b+c=1.

Preferably, the $R^1$ and $R^2$ are individually $C_{1-18}$alkyl, $C_{6-20}$aryl, $C_{7-18}$alkylaryl, $C_{7-18}$arylalkyl, $C_{5-12}$cycloalkyl, $C_{2-18}$alkenyl, glycol, epoxy (provided that the oxygen atom is not bonded directly to a Si-atom), $C_{1-18}$alkoxy, $C_{2-20}$ unsaturated hydrocarbons such as vinyl, allyl, propenyl, isopropenyl and terminal $C_{4-18}$ alkenyl, alkynyl, vinyl ether, and allyl ether groups.

More preferably, $R^1$ and $R^2$ are independently methyl, ethyl, vinyl, allyl, methoxy, ethoxy, and phenyl groups.

The molecule may contain or form silsesquioxanes, and polyphenyl- and/or polymethylsilsesquioxanes from the T units.

The organopolysiloxane resin may be terminated with conventional end groups, such as trialkylsilyl, dialkylsilanolyl, dialkylalkoxysilyl, alkyldialkoxysilyl, dialkylvinylsilyl, triarylsilyl, diarylsilanolyl, diarylalkoxysilyl, aryldialkoxysilyl, diarylvinylsilyl, and the like.

The organopolysiloxane resin preferably comprises 0–15 mole percent Q units, 30–100 mole percent T units, 0–20 mole percent M units, and 0–20 mole percent D units, based on the total number of moles of the organopolysiloxane resin. More preferably, the organopolysiloxane resin comprises 0–5 mole percent Q units, 75–100 mole percent T units, 0–10 mole percent M units, and 0–10 mole percent D units, based on the total number of moles organopolysiloxane resin. Even more preferably, the organopolysiloxane resin comprises 95 mole percent T units and, 5 mole percent D units, based on the total number of moles of the organopolysiloxane resin. Most preferably, the organopolysiloxane resin comprises 57 mole percent T-phenyl units, 39 mole percent T-methyl units, and 4 mole percent D-methyl units.

In at least one embodiment, the organopolysiloxane resins soften in the range of 30° C. to 109° C., more preferably 30° C. to 70° C., and most preferably in the range of 45° C. to 60° C., as determined by DIN 53180 "Softening Point of Resins." A preferred resin is SILRES 530 or REN 168, available from Wacker Chemical, Adrian, Mich., a methyl phenyl organopolysiloxane resin having a ratio of phenyl to methyl groups of 1.1:1, and a softening point in the range of 50–70° C. In at least one embodiment, a preferred resin will have a phenyl content of 100–0%, more preferable 80–20%, and most preferably 60–50%: a methyl composition of 0–100%, more preferably 20–80%, or most preferably 40–50%: an alkyl content of 0–100%; the resin's phenyl to methyl (or alkyl) ratio should be 5:1, more preferably 3:1, preferably 0.6:1 and most preferable 1.1:1.

Preferably, the organopolysiloxane resin has an silanol/alkoxy content of less than 20 weight percent, based on the weight of the organopolysiloxane resin, more preferably less than 10 weight percent, and most preferably at, or less than, 6 weight percent.

The organopolysiloxane resin is preferably a solid at room temperature having a weight average molecular weight of 500 to 100,000, more preferably 750 to 50,000, and most preferably 1,200 to 14,000.

The polyester is a saturated polyester with hydroxyl functionality. The polyester could also be an intermediate (i.e., not fully reacted) having a Tg of at least 30° C.

Suitable polyesters are formed in conventional manner from carboxylic acids (or their anhydrides) having acid functionalities of 2 or greater and polyols having hydroxyl functionalities of 2 or greater. Examples of suitable multi-functional carboxylic acids include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and like carboxylic acids, Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2'-bis(4-cyclohexanol)propane, neopentyl glycol, 2,2,3-trimethylpentane-1,3-diol, 1,4-dimethylolcyclohexane, 2,2,4-trimethylpentane diol, etc.

Whether the polyester is substantially carboxylic acid functional having —COOH moieties, or hydroxyl functional having —OH groups, depends upon the —COOH/—OH molar ratio of the monomer mix. Most hydroxyl functional polyesters useful in the invention have hydroxy equivalent weights between 70 and 5,610. Most carboxylic acid functional polyesters useful in the invention have acid numbers of between 25 and 100 mg KOH/g. Most polyesters useful in the invention may be substantially straight chain having either hydroxyl or carboxylic acid functional of 2 or more or may be branched having hydroxyl or carboxylic acid functionality more than 2.5. In some cases, mixtures of polyesters having different functionalities may be used.

In certain embodiments, the polyester is prepared by reacting isophthalic acid with trimethylol propane. Alternatively, other acids, such as isophthalic acid, TPA, trimelitic anhydride, and tetrahydraphthalic acid, and other alcohols, such as TME, MPG, TMP, and NPG can be used. It is prepared using a condensation reaction. The polyester is then reacted with SILRES REN 168 available from Wacker Silicones in Adrian, Mich. The silicone could be added to polyester before the polyester reaction is entirely complete. In certain embodiments, the silicone is a methyl phenyl silicone resin with 3–6% silanol functionality. The resulting product is a silicone polyester having hydroxyl functionality. This silicone polyester is suitable to be formed into a stable particulate, such as flake or powder, by conventional forming techniques, such as grinding.

The particulate silicone polyester is useable to form a coating composition, which can be clear or pigmented. Compositions of powdered coatings employing the silicone polyester resins of the present invention can be made by those skilled in the art. The coating composition includes a solid crosslinker and an optional pigment and/or extender. Any suitable solid pigment or extender can be used. Suitable solid crosslinkers include, but are not limited to, melamines and isocyanates, with isocyanates being preferred. Depending upon the particular powdered coating composition, the composition in one embodiment comprises 20–90 weight % silicone polyester, 10–80 weight % crosslinker, and 0.25–70 weight % pigment/dye and/or extender and/or filler. In at least another embodiment, the composition comprises 30–80 weight % silicone polyester, 20–70 weight % crosslinker, and 0.5–60 weight % pigment and/or extender and/or filler. In yet at least another embodiment, the composition comprises 40–70 weight % silicone polyester, 30–60 weight % crosslinker, and 1–50 weight % pigment and/or extender and/or filler. When pigment is not present, the composition in at least one embodiment comprises 10–90 weight % silicone polyester and 10–90 weight % crosslinker, in at least another embodiment 15–85 weight % silicone polyester and 15–85 weight % crosslinker, and in at least yet another embodiment 20–80 weight % silicone polyester and 20–80 weight % crosslinker. Filler and/or extenders can optionally be present in the above compositions in amounts up to 70 weight %.

The suitable components that are typically found in similar types of coatings can be used, such as, but not limited to dyes, flow additives, and modifying polymers. The modifying polymers can replace some of the silicone polyester in the coating composition. The modifying polymers can be non-siliconized polyester, silicone, or a mixture thereof. When present, the modifying polymers can be present in up to 90 weight percent of the silicone polymer. In other words, 90 weight % of the amount of the silicone polyester component could comprise modifying polymers with the remaining 10% comprising the silicone polyester of the present invention.

The coating composition is prepared by combining the solid silicone polyester with the crosslinker (and any other optional component present) by any suitable technique known to those skilled in the art. The components of the composition are dry blended and heated, such as by melt extruding, to form a viscous liquid mixture. The silicone polyester resins and suitable crosslinkers may be melt, solution or cryogenically blended with the remaining compositions components as is known in the art. "Melt blending" is used in the conventional sense, e.g. to mean that the silicone polyester resin, the crosslinker, and any other components are melt mixed. Preferably, the components are melt mixed in an extruder, as is known in the art. Preferably, the composition components are melt blended in the extruder. The molten mixture has the consistency of a taffy or paste.

The heated composition then is allowed to cool or is chilled, at least in part in at least one embodiment by passing the composition through chill rolls, to form a solid composition which comprises a uniform mixture of the coating composition components. The coating composition is then chopped and ground to suitable powder size for coating application. The suitable particle size of the coating powder is between 2 and 250 microns, more preferably 5 and 150 microns, even more preferably between 10 and 60 microns, and most preferably between 20 and 40 microns. The powdered coating compositions generally contain customary additional ingredients such as but not limited to dyes, pigments, fillers, other additives, such as flow and/or adhesion promoters, UV modifiers, other modifying polymers, and the like.

The so formed coating composition can be used to coat various substrates such as cookware, such as cookie sheets and pots and pans, automotive parts such as mufflers and engine parts, lawn furniture, outdoor signs, exterior building parts, metal coils, and other metal objects. The manner of depositing the coating is not critical, however, electrostatic spraying and dip coating, such as fluidize bed coating, have been found to be particularly suitable.

The powder deposited on an article is then heat cured to convert it into a uniform crosslinked film. Usually the curing conditions are at a temperature ranging from 150° C. to 500° C. for from 5 to 50 minutes.

The film, when properly prepared from the composition in this invention, has many superior properties such as good weather durability, good heat resistance, good adhesion, good corrosion resistance, good scratch resistance and especially, no leveling faults and an excellent mar resistance.

Having generally described this invention, a further understanding can be obtained by reference to certain specific examples which are provided herein for purposes of illustration only and are not intended to be limiting unless otherwise specified.

EXAMPLE 1

Trimethylol propane, isophthalic acid and adipic acid are reacted together in a three neck round bottom flask in the amount shown in table 1 in step A at a temperature of 190° C. until 42 grams of water is collected and the resulting product had an acid number of 10 mg KOH/gram. The mixture forms a polyester having a Tg which is greater than 30° C. which is then cooled down to 130° C. The silicone in step B, having a Tg which is less than 30° C., is then added to the polyester. The silicone in step B is a liquid, low methyl phenyl ratio polymer with a molecular weight of 1200. The reactor is then heated to 170° C. where the reaction took place until 21 grams of alcohol is collected. If suitable, the resulting product is poured from the melted state onto an aluminum tray and allowed to cool to room temperature to form a solid sheet of silicone polyester. The solid sheet of silicone polyester is broken into a flake form if possible.

For the resin in example 1, the Tg is less than room temperature, the silicone content is 31.31%, the equivalent weight is 322.9 grams/mole of OH and the acid number is 10 milligrams of KOH/gram.

The silicone polyester of example 1 is gummy in appearance and is not capable of being formed into a flake or powder.

TABLE 1

| Step | Component | Amount (g) | Moles |
|---|---|---|---|
| A | TMP (trimethylol propane) | 207 | 4.66 |
| | IPA (isophthalic acid) | 127 | −1.53 |
| | ADA (adipic acid) | 56 | −0.77 |
| | Subtotal | 390 | |
| | Collect water | 42 | 2.3 |
| | Theoretical OH | | 2.36 |
| | Temperature (° C.) | 190 | |
| B | SYLRES SY 231 | 177 | .8 |
| | Subtotal | 503.76 | |
| | Temperature (° C.) | 170 | |
| | Alcohol | 21 | .66 |
| | Theoretical (OH) | | 1.56 |
| | Silicone Content (%) | 31.31 | |
| | Eq. wt. (g/mole OH) | 322.9 | |
| | Acid # (mg KOH/g) | 10 | |
| | Appearance | Gummy | |

EXAMPLE 2

Trimethylol propane, isophthalic acid and adipic acid are reacted together in a three necked round bottom flask in the amount shown in table 2 in step A at a temperature of about 190° C. until about 40 grams of water is collected and the resulting product had an acid number of about 15. The mixture forms a polyester having a Tg of which is greater than 30° C. which is then cooled down to about 130° C. The silicone in step B, having a Tg of about 52° C., is then added to the polyester. The reactor is then heated to 170° C. where the reaction takes place until 4.5 grams of water is collected. If suitable, the resulting product is poured from the melted state onto an aluminum tray and allowed to cool to room temperature to form a solid sheet of silicone polyester.

For the resin in example 2, the Tg is less than room temperature, the silicone content is 31.31%, the equivalent weight is 242.33 grams/mole of OH and the acid number is 15.37 milligrams of KOH/gram.

The silicone polyester of example 2 is gummy in appearance and is not capable of being formed into a flake or powder.

TABLE 2

| Step | Component | Amount (g) | Moles |
|---|---|---|---|
| A | TMP | 207.96 | 4.66 |
| | IPA | 127 | −1.53 |
| | ADA | 56 | −0.76712 |
| | Subtotal | 390.96 | |
| | Theoretical OH | | 2.36 |
| | Water collected | 39.98 | 2.22 |
| | Temperature (° C.) | 192 | |
| B | REN 168 | 164.5 | |
| | Subtotal | 510.98 | |
| | Time | | |
| | Temperature (° C.) | 170 | |
| | Water | 4.5 | 0.25 |
| | Theoretical (OH) | | 2.11 |
| | Silicone Content (%) | 31.31 | |
| | Eq. wt. (g/mole OH) | 242.33 | |
| | Acid # (mg KOH/g) | 15.37 | |
| | Appearance | Gummy | |

EXAMPLE 3

The same as example 2 except no adipic acid is used in step A and more isophthalic acid is used in step A. The amounts of the components are shown in table 3. The materials in Step A are heated from 170° C. to 200° C.

The silicone polyester in example 3 has a Tg which is greater than 30° C., a silicone content of 31%, an equivalent weight of 238.39 grams per mole OH and an acid number of 5.49 milligrams KOH per gram.

The product in Example 3 forms a stable solid mass which is able to be converted to flakes.

TABLE 3

| Step | Component | Amount (g) | Moles |
|---|---|---|---|
| A | TMP | 208.10 | 4.66 |
| | IPA | 190.24 | −2.29 |
| | ADA | | 0 |
| | Subtotal | 398.34 | |
| | Theoretical-OH | | 2.37 |
| | Water collect | 41.69 | 2.32 |
| | Sub yield | 356.65 | |
| | Temp. of cook (° C.) | 170–200 | |

TABLE 3-continued

| Step | Component | Amount (g) | Moles |
|------|-----------|------------|-------|
| B | REN 168 | 164.5 | |
| | Subtotal | 521.15 | |
| | Yield | 517.63 | |
| | Time | | |
| | Temp. of cook (° C.) | 170 | |
| | Water | 3.52 | 0.195556 |
| | Theoretical-OH | | 2.17 |
| | Silicone Content (%) | 31 | |
| | Eq. wt. (g/mole OH) | 238.39 | |
| | Acid # (mg KOH/g) | 5.49 | |
| | Appearance | Flake | |

EXAMPLE 4

Same as example 3 except with the different amount of components as shown in table 4. The materials in step A are heated from 205° C. to 230° C.

The resulting silicone polyester of example 4 has a Tg which is greater than 30° C., a silicone content of 31%, an equivalent weight of 222.23 grams per mole OH and an acid number of 4.77.

The product in example 4 forms a stable solid mass which is able to be converted to flakes.

TABLE 4

| Step | Component | Amount (g) | Moles |
|------|-----------|------------|-------|
| A | TMP | 416.80 | 9.33 |
| | IPA | 381.00 | -4.59 |
| | ADA | | |
| | Subtotal | 797.8 | |
| | Theoretical-OH | | 4.74 |
| | Water collect | 78.40 | 4.36 |
| | Sub yield | 719.4 | |
| | Temp. of cook (° C.) | 209–227 | |
| B | REN 168 | 329.20 | |
| | Subtotal | 1048.6 | |
| | Yield | 1048.16 | |
| | Temp. of cook (° C.) | 179.00 | |
| | Water | 0.44 | 0.024444 |
| | Theoretical-OH | | 4.72 |
| | Silicone Content (%) | 31 | |
| | Eq. wt. (g/mole OH) | 222.23 | |
| | Acid # (mg KOH/g) | 4.77 | |
| | Appearance | Flake | |

EXAMPLE 5

Example 5 is the same as example 4 except for the different amount of components used which is shown in table 5. Also, in step A, the materials are heated from 185° C. to 234° C.

The amount of water collected in step B and example 4 is 184 grams. The resulting silicone polyester from example 5 has a Tg which is greater than 30° C., a silicone content of 31%, an equivalent weight of 227.6 grams per mole OH and an acid number of 9.54 milligrams KOH per gram.

The product in example 5 forms a stable solid mass which is able to be converted to flakes.

TABLE 5

| Step | Component | Amount (g) | Moles |
|------|-----------|------------|-------|
| A | TMP | 419.00 | 9.38 |
| | IPA | 380.90 | -4.59 |
| | ADA | | |
| | Subtotal | 799.9 | |
| | Theoretical-OH | | 4.79 |
| | Water collect | 82.82 | 4.60 |
| | Sub Yield | 717.08 | |
| | Temp. of cook (° C.) | 185–234 | |
| B | REN 168 | 330.50 | |
| | Subtotal | 1047.58 | |
| | Yield | 1043.89 | |
| | Water | 184.00 | |
| | Theoretical-OH | 3.69 | 0.21 |
| | | | 4.59 |
| | Silicone Content (%) | 31 | |
| | Eq. wt. (g/mole OH) | 227.60 | |
| | Acid # (mg KOH/g) | 9.54 | |
| | Appearance | Flake | |

EXAMPLE 6

Same as example 5 except for varying the amounts of the components as shown in table 6. In step A, the materials are heated from 194° C. to 217° C. The amount of water collected in step A is 37.70 grams.

The amount of water collected in step B is 44.40 grams.

The resulting silicone polyester in example 6 has a Tg of 40° C., a silicone content of 30%, an equivalent weight of 247.81 grams per mole OH, and an acid number of 16.83 milligrams of KOH per gram.

The product in example 6 forms a stable solid mass which is able to be converted to flakes.

TABLE 6

| Step | Component | Amount (g) | Moles |
|------|-----------|------------|-------|
| A | TMP | 1674.00 | 37.48 |
| | IPA | 1519.00 | -18.30 |
| | ADA | | |
| | Subtotal | 3193 | |
| | Theoretical-OH | | 19.18 |
| | Water collect | 307.70 | 17.09 |
| | Sub yield | 2885.3 | |
| | Temp. of cook (° C.) | 194–217 | |
| B | REN 168 | 1300.00 | |
| | Subtotal | 4185.3 | |
| | Yield | 4140.9 | |
| | Water | 44.40 | 2.47 |
| | Theoretical-OH | | 16.71 |
| | Silicone Content (%) | 30 | |
| | Eq. wt. (g/mole OH) | 247.81 | |
| | Acid # (mg KOH/g) | 16.83 | |
| | Appearance | Flake | |

EXAMPLE 7

Example 7 is the same as example 6 except that the amount of the components differ as shown in table 7. The amount of water collected in step A of example 6 is 243.9 grams. In step A of example 7, the materials are heated from 195° C. to 200° C.

The amount of water collected in step B of example 7 is 16.9 grams.

The silicone content of the resulting silicone polyester of example 7 is 31%, the equivalent weight is 235.08 grams per mole OH, and the acid number is 20.34 milligrams of KOH per gram. The Tg of the silicone polyester which is greater than 30° C.

The produce in example 7 forms a stable solid mass which is able to be converted to flakes.

TABLE 7

| Step | Component | Amount (g) | Moles |
|---|---|---|---|
| A | TMP | 1326.00 | 29.69 |
|   | IPA | 1212.00 | −14.60 |
|   | ADA | | |
|   | Subtotal | 2538 | |
|   | Theoretical-OH | | 15.08 |
|   | Water collect | 243.90 | 13.55 |
|   | Sub yield | 2294.1 | |
|   | Temp. of cook (° C.) | 195–200 | |
| B | REN 168 | 1048.00 | |
|   | Subtotal | 3342.1 | |
|   | Yield | 3325.2 | |
|   | Water | 16.90 | 0.94 |
|   | Theoretical-OH | | 14.15 |
|   | Silicone Content (%) | 31 | |
|   | Eq. wt. (g/mole OH) | 235.08 | |
|   | Acid # (mg KOH/g) | 20.34 | |
|   | Appearance | Flake | |

EXAMPLE 8

Example 8 is the same as example 7 except that the amount of the components differ as shown in table 8.

The amount of water collected in example 8 is 29.9 grams. In step A of example 8, the materials are heated from 221° C. to 230° C.

The amount of water collected in step B of example 8 is 0.9 grams.

The resulting silicone polyester has a Tg which is greater than 30° C., a silicone content of 31%, an equivalent weight of 229.3 grams per mole OH, and an acid number of 8.13 milligrams KOH per gram.

The product in example 8 is forms a stable solid mass which is able to be converted to flakes.

TABLE 8

| Step | Component | Amount (g) | Moles |
|---|---|---|---|
| A | TMP | 189.00 | 4.23 |
|   | IPA | 173.00 | −2.08 |
|   | ADA | | |
|   | Subtotal | 362 | |
|   | Theoretical-OH | | 2.15 |
|   | Water collect | 29.90 | 1.66 |
|   | Sub yield | 332.1 | |
|   | Temp. of cook (° C.) | 221–231 | |
| B | REN 168 | 149.70 | |
|   | Subtotal | 481.80 | |
|   | Yield | 480.9 | |
|   | Water | 0.90 | 0.05 |
|   | Theoretical-OH | | 2.10 |
|   | Silicone Content (%) | 31 | |
|   | Eq. wt. (g/mole OH) | 229.33 | |
|   | Acid # (mg KOH/g) | 8.13 | |
|   | Appearance | Flake | |

EXAMPLE 9

Example 9 is the same as example 8 except that the amount of the components differ as shown in table 9. The amount of water collected in step A of example 9 is 240.7 grams and the temperature of the reaction of step A is 196° C.

The amount of water collected in step B of example 9 is 10.9 grams and the temperature of the reaction in step B is between 125° C. and 152° C.

The resulting silicone polyester of example 9 has a Tg which is greater than 30° C., a silicone content of 31%, an equivalent weight of 230.38 grams per mole OH, and an acid number of 20 milligrams KOH per gram.

The product in example 9 forms a stable solid mass which is able to be converted to flakes.

TABLE 9

| Step | Component | Amount (g) | Moles |
|---|---|---|---|
| A | TMP | 1328.00 | 29.73 |
|   | IPA | 1214.00 | −14.63 |
|   | ADA | | |
|   | Subtotal | 2542 | |
|   | Theoretical-OH | | 15.10 |
|   | Water collect | 240.70 | 13.37 |
|   | Sub yield | 2301.3 | |
|   | Temp. of cook (° C.) | 196.00 | |
| B | REN 168 | 1050.00 | |
|   | Subtotal | 3351.3 | |
|   | Yield | 3340.4 | |
|   | Temp. of cook (° C.) | 125–152 | |
|   | Water | 10.90 | 0.61 |
|   | Theoretical-OH | | 14.50 |
|   | Silicone Content (%) | 31 | |
|   | Eq. wt. (g/mole OH) | 230.38 | |
|   | Acid # (mg KOH/g) | 20.00 | |
|   | Appearance | Flake | |

EXAMPLE 10

Example 10 is the same as example 9 except that the amount of the components differ as shown in table 10. The amount of water collected in step A of example 10 is 78.38 grams and the temperature of the reaction of step A is between 200–220° C.

The amount of water collected in step B of example 10 is 4.18 grams and the temperature of the reaction in step B is between 130–180° C.

The resulting silicone polyester of example 10 has a Tg of 43.6° C., a silicone content of 30.95%, an equivalent weight of 319.58 grams per mole OH, and an acid number of 15.2 milligrams KOH per gram.

The product in example 10 forms a stable solid mass which is able to be converted to flakes.

TABLE 10

| Step | Component | Amount (g) | Moles |
|---|---|---|---|
| A | TMP | 410.00 | 25.70 |
|   | IPA | 449.00 | −15.14 |
|   | Subtotal | 859 | |
|   | Theoretical-OH | | 10.56 |
|   | Water collect | 78.38 | 13.94 |
|   | Sub yield | 780.62 | |
|   | Temp. of cook (° C.) | 200 to 220 | |

TABLE 10-continued

| Step | Component | Amount (g) | Moles |
|---|---|---|---|
| B | REN 168 | 354.00 | |
| | Subtotal | 1134.62 | |
| | Yield | 1130.44 | |
| | Temp. of cook (° C.) | 130 to 180 | |
| | Water | 4.18 | 1.53 |
| | Theoretical-OH | | 9.03 |
| | Silicone Content (%) | 30.95 | |
| | Eq. wt. (g/mole OH) | 319.58 | |
| | Acid # (mg KOH/g) | 15.20 | |
| | Appearance | flake | |

EXAMPLE 11

Example 11 is the same as example 10 except that the amount of the components differ as shown in table 11. The amount of water collected in Step A of example 11 is 250.9 grams and the temperature of the reaction of step A is 200–220° C.

The amount of water collected in step B of example 11 is 27.54 grams and the temperature of the reaction in step B is between 130° C. and 180° C.

The resulting silicone polyester of example 11 has a Tg of 46.11° C., a silicone content of 30.95%, an equivalent weight of 345.58 grams per mole OH, and an acid number of 12.68 milligrams KOH per gram.

The product in example 11 forms a stable solid mass which is able to be converted to flakes.

| Step | Component | Amount (g) | Moles |
|---|---|---|---|
| A | TMP | 1148 | 25.70 |
| | IPA | 1257 | −15.14 |
| | ADA | 0 | |
| | Subtotal | 2405 | |
| | Theoretical-OH | | 10.56 |
| | Water collect | 250.90 | 13.94 |
| | Sub yield | 2154.1 | |
| | Temp. of cook (° C.) | 200–220 | |
| B | REN 168 | 993.00 | |
| | Subtotal | 3147.1 | |
| | Yield | 3119.56 | |
| | Temp. of cook (° C.) | 9.03–11.3 | |
| | Water | 130 to 180 | 1.53 |
| | Theoretical-OH | | 9.03 |
| | Silicone Content (%) | 30.95 | |
| | Eq. wt. (g/mole OH) | 345.58 | |
| | Acid # (mg KOH/g) | 12.68 | |
| | Appearance | flake | |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A solid silicone polyester suitable for a powder coating, said silicone polyester prepared by reacting a silicone with a polyester, the resulting silicone polyester having a Tg between 35° C. and 75° C., wherein the polyester and the silicone being reacted to form the silicone polyester each have a Tg greater than 30° C.;

wherein the silicone comprises a silanol-functional organopolysiloxane resin which contains at least one or more of the repeating units having the formulae:

  (D units)

  (T units)

wherein $R^1$ and $R^2$ are indenendendy a $C_{1-20}$ hydrocarbon, optionally interspersed with a hereroatom linking group such as, but not limited to,

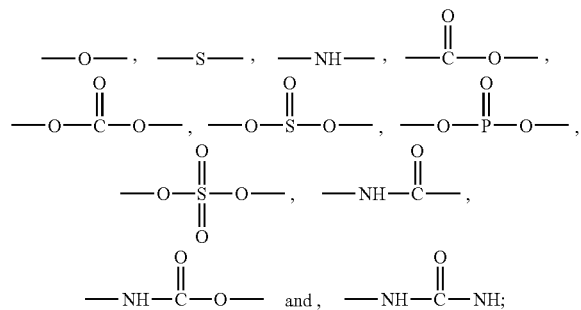

a is an integer of 0, 1, 2 or 3, preferably 0, 1, or 2;
b is an integer of 0, 1, 2 or 3, preferably 0, 1, or 2; and
in D units, a+b+c=2, and
in T units, a+b+c=1; and
wherein the organopolysiloxane resin comprises 95 mole percent T units and 5 mole percent D units, based on the total number of moles of the organopolysiloxane resin.

2. The silicone polyester of claim 1 wherein the silicone polyester has a Tg between 35° C. and 50° C.

3. The silicone polyester of claim 1 wherein the silicone polyester is aliphatic with hydroxyl functionality.

4. The silicone polyester of claim 1 wherein the silicone polyester has a molecular weight of between 500–500,000.

5. The silicone polyester of claim 4 wherein the silicone polyester comprises 28–33 weight % silicone and 67–72 weight % polyester.

6. The silicone polyester of claim 1 wherein the polyester and the silicone being reacted to form the silicone polyester each have a Tg between 35–115° C.

7. The silicone polyester of claim 1 wherein the polyester is formed by reacting an aromatic carboxylic acid with a tri-functional alcohol.

8. A method of forming the solid silicone polyester of claim 1 comprising reacting a polyester having a Tg greater than 30° C. with a silicone having a Tg greater than 30° C.

9. The method of claim 8 wherein the polyester and the silicone being reacted to form the silicone polyester each have a Tg between 35–115° C.

10. A solid silicone polyester suitable for a powder coating, said silicone polyester prepared by reacting a silicone with a polyester, the resulting silicone polyester having a Tg between 35° C. and 50° C.; and wherein the polyester and the silicone being reacted to form the silicone polyester each have a Tg greater than 30° C.;

wherein the silicone comprises a silanol-functional organopolysiloxane resin which contains at least one or more of the repeating units having the formulae:

wherein $R^1$ and $R^2$ are independently a $C_{1-20}$ hydrocarbon, optionally interspersed with a heteroatom linking group such as, but not limited to,

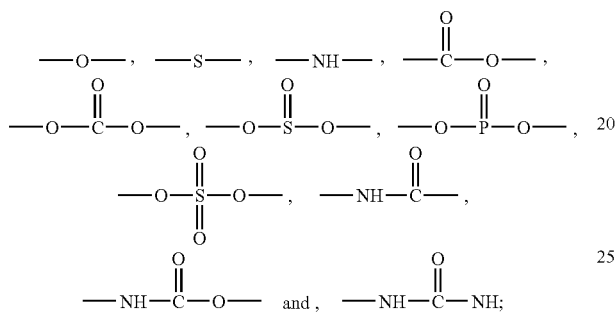

a is an integer of 0, 1, 2 or 3, preferably 0, 1, or 2;
b is an integer of 0, 1, 2 or 3, preferably 0, 1, or 2; and
in D units, a+b+c=2, and
in T units, a+b+c=1; and
wherein the organononolysiloxane resin comprises 95 mole percent T units and 5 mole percent D units, based on the total number of moles of the organopolysiloxane resin.

11. The silicone polyester of claim 10 wherein the silicone polyester comprises 28–33 weight % silicone and 67–72 weight % polyester.

12. The silicone polyester of claim 11 wherein the silicone polyester is aliphatic with hydroxyl functionality.

13. The silicone polyester of claim 12 wherein the polyester is a saturated polyester with hydroxyl functionality.

14. A coating composition comprising a solid silicone polyester having a Tg between 35° C. to 75° C., and a solid crosslinker, wherein the polyester and the silicone being reacted to form the silicone polyester each have a Tg greater than 30° C.;
wherein the silicone comprises a silanol-functioflal organopolysiloxane resin which contains at least one or more of the repeating units having the formulae:

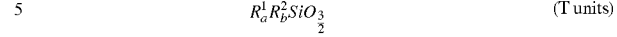

wherein
$R^1$ and $R^2$ are independently a $C_{1-20}$ hydrocarbn, optionally interspersed with a heteroatom linking group such as, but not limited to,

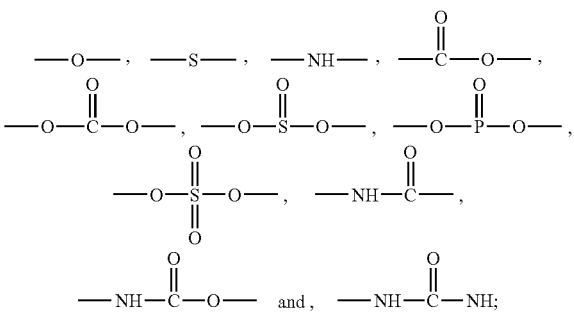

a is an integer of 0, 1, 2 or 3, preferably 0, 1, or 2;
b is an integer of 0, 1, 2 or 3, preferably 0, 1, or 2; and
in D units, a+b+c=2, and
in T units, a+b+c=1; and
wherein the organopolysiloxane resin comprises 95 mole percent T units and 5 mole percent D units, based on the total number of moles of the organopolysiloxane resin.

15. The coating composition of claim 14 wherein the silicone polyester is aliphatic with hydroxyl functionality.

16. The coating composition of claim 14 wherein the polyester and the silicone being reacted to form the silicone polyester each having a Tg greater than 30° C.

17. The coating composition of claim 16 wherein the polyester and the silicone being reacted to form the silicone polyester each have a Tg between 35–115° C.

18. A coating comprising the cured coating composition of claim 14.

19. A coated product comprising a metal substrate having the coating of claim 18 thereon.

* * * * *

UNITED STATES PATENT AND TRADEMARK OFFICE
CERTIFICATE OF CORRECTION

| | | |
|---|---|---|
| PATENT NO. | : 7,129,310 B2 | Page 1 of 1 |
| APPLICATION NO. | : 10/745181 | |
| DATED | : October 31, 2006 | |
| INVENTOR(S) | : Greene et al. | |

It is certified that error appears in the above-identified patent and that said Letters Patent is hereby corrected as shown below:

Title Page (75) Inventors:

Delete the middle initial "A." and insert -- D.-- for the first named inventor.

Column 16, Line 10, Claim 14:

Delete "hydrocarbn" and insert therefor -- hydrocarbon --.

Signed and Sealed this

Sixth Day of February, 2007

JON W. DUDAS
*Director of the United States Patent and Trademark Office*